(12) United States Patent
Mai et al.

(10) Patent No.: US 12,145,087 B2
(45) Date of Patent: Nov. 19, 2024

(54) DEVICE FOR APPLYING MAGNETIC FIELD TO A FILTER FOR REDUCING METALLIC CONTAMINANTS

(71) Applicant: TAIWAN SEMICONDUCTOR MANUFACTURING COMPANY, LTD., Hsinchu (TW)

(72) Inventors: Hsuan-Ying Mai, Taoyuan (TW); Hui-Chun Lee, Hsinchu (TW); Chun-Kuang Chen, Zhubei (TW); Tung-Hung Feng, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 17/874,272

(22) Filed: Jul. 26, 2022

(65) Prior Publication Data

US 2022/0362693 A1 Nov. 17, 2022

Related U.S. Application Data

(62) Division of application No. 16/548,532, filed on Aug. 22, 2019, now Pat. No. 11,666,838.

(Continued)

(51) Int. Cl.
*B01D 35/06* (2006.01)
*B01D 35/30* (2006.01)
(Continued)

(52) U.S. Cl.
CPC ............. *B01D 35/06* (2013.01); *B01D 35/30* (2013.01); *B03C 1/288* (2013.01); *B03C 1/30* (2013.01);
(Continued)

(58) Field of Classification Search
CPC ........ B01D 35/06; B01D 35/30; B01D 29/15; B01D 29/902; B03C 1/288; B03C 1/30;
(Continued)

(56) References Cited

U.S. PATENT DOCUMENTS 3,460,679 A 8/1969 Llewellyn
4,585,553 A 4/1986 Hikosaka et al.
(Continued)

FOREIGN PATENT DOCUMENTS

JP 2002316068 A * 10/2002

OTHER PUBLICATIONS

Magnet at a Distance https://van.physics.illinois.edu/ask/listing/419 (Year: 2007).*
Non-Final Office Action issued in U.S. Appl. No. 16/548,532, dated Nov. 25, 2020.
Final Office Action issued in U.S. Appl. No. 16/548,532, dated May 25, 2021.
Non-Final Office Action issued in U.S. Appl. No. 16/548,532, dated Nov. 29, 2021.
(Continued)

*Primary Examiner* — Liam Royce
(74) *Attorney, Agent, or Firm* — STUDEBAKER & BRACKETT PC

(57) ABSTRACT

A filter is used for removing metallic contaminants in a solvent used in microcircuit fabrication. The filter includes a filter housing including a filter membrane for filtering solvent including metallic contaminants, and a magnet arranged about the filter housing and configured to generate a magnetic field to attract the metallic contaminants prior to the metallic contaminants entering the filter membrane. The magnet is arranged such that the magnetic field of the magnet is greater in a periphery of the filter housing compared to a central portion of the filter housing.

20 Claims, 9 Drawing Sheets

Related U.S. Application Data

(60) Provisional application No. 62/753,915, filed on Oct. 31, 2018.

(51) Int. Cl.
    *B03C 1/28*     (2006.01)
    *B03C 1/30*     (2006.01)

(52) U.S. Cl.
    CPC ...... *B03C 2201/18* (2013.01); *B03C 2201/20* (2013.01); *B03C 2201/22* (2013.01)

(58) Field of Classification Search
    CPC ............ B03C 2201/18; B03C 2201/20; B03C 2201/22; B03C 2201/0332
    See application file for complete search history.

(56) References Cited

U.S. PATENT DOCUMENTS

| | | |
|---|---|---|
| 4,894,153 A | 1/1990 | Shirdavant |
| 5,354,462 A | 10/1994 | Perritt |
| 5,556,540 A | 9/1996 | Brunsting |
| 5,932,108 A | 8/1999 | Brunsting |
| 2008/0149549 A1 | 6/2008 | Lee et al. |
| 2016/0008821 A1 | 1/2016 | Yount et al. |
| 2016/0074782 A1 | 3/2016 | Gunasekera |

OTHER PUBLICATIONS

Non-Final Office Action issued in U.S. Appl. No. 16/548,532, dated Jun. 7, 2022.

Final Office Action issued in related U.S. Appl. No. 16/548,532, dated Sep. 21, 2022.

* cited by examiner

DEVICE FOR APPLYING MAGNETIC FIELD TO A FILTER FOR REDUCING METALLIC CONTAMINANTS

CROSS REFERENCE TO RELATED APPLICATION

This application is a divisional application of and claims priority to U.S. non-provisional application Ser. No. 16/548,532, filed Aug. 22, 2019, which claims priority to U.S. provisional application Ser. No. 62/753,915 filed on Oct. 31, 2018, the entire contents of which are incorporated herein by reference.

BACKGROUND

The semiconductor integrated circuit (IC) industry has experienced rapid growth. Technological advances in IC materials and design have produced generations of ICs where each generation has smaller and more complex circuits than the previous generation. However, these advances have increased the complexity of processing and manufacturing ICs and, for these advances to be realized, similar developments in IC processing and manufacturing are needed. In the course of integrated circuit evolution, functional density (i.e., the number of interconnected devices per chip area) has generally increased while geometry size (i.e., the smallest component (or line) that can be created using a fabrication process) has decreased.

As pattern sizes of semiconductor devices become smaller and semiconductor devices having new structures are developed, contaminant-free liquids have been used for fabricating integrated circuits. Point-of-use (POU) filters are designed to remove contaminants from the liquids used in integrated circuit manufacture. For example, during photolithographic processes, the photoresist is filtered to minimize presence of metal contaminants/impurities and minimize defects in photoresist patterns.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

Figure 1:
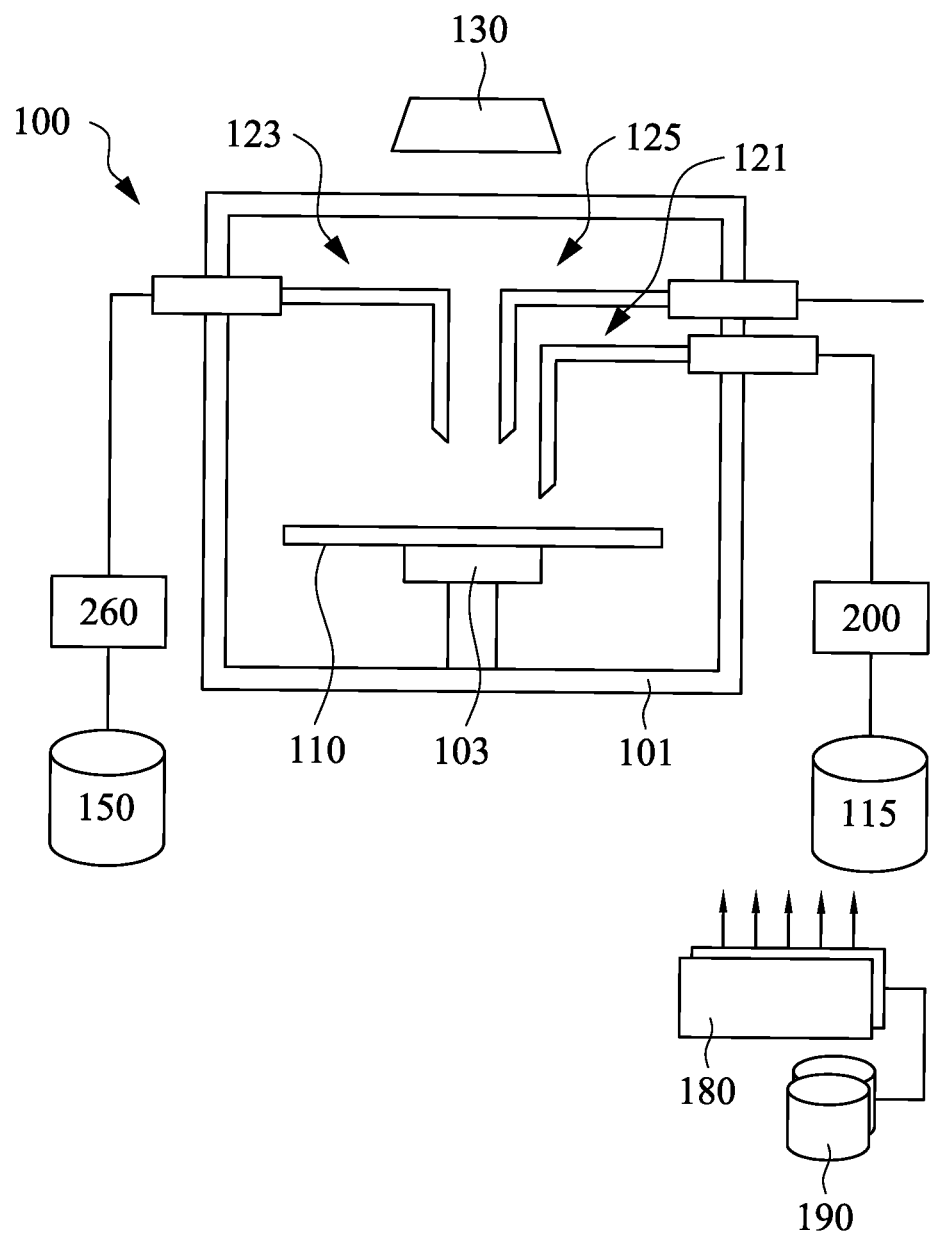
FIG. 1 is a schematic view of an apparatus for applying a solvent to a semiconductor wafer, according to embodiments of the disclosure.

It is to be understood that the following disclosure provides many different embodiments, or examples, for implementing different features of the disclosure. Specific embodiments or examples of components and arrangements are described below to simplify the present disclosure. These are, of course, merely examples and are not intended to be limiting. For example, dimensions of elements are not limited to the disclosed range or values, but may depend upon process conditions and/or desired properties of the device. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Various features may be arbitrarily drawn in different scales for simplicity and clarity.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly. In addition, the term "made of" may mean either "comprising" or "consisting of."

Contaminant-free fluids (e.g., photoresist, developer, etchant, etc.) are used in the fabrication of integrated circuits. Point-of-use filters are designed as the last opportunity to remove contaminants from the fluids used in integrated circuit manufacture. A point-of-use filter processes fluid which is to be utilized immediately in a localized manufacturing step. The manufacture of integrated circuits involves multiple steps in which silicon wafers are repeatedly exposed to processes such as lithography, etching, doping, and deposition of metals. Throughout all of these steps, the semiconductive nature of the silicon and its surface must be maintained and/or specifically controlled. Contamination can alter the semiconductive nature of the silicon or disturb the intended circuit design, thereby reducing the yield of integrated circuits. Particles as small as 0.1 micrometer may, therefore, lead to failure of a semiconductor element. A particle can prevent the completion of a line or a particle can bridge across two lines. Contamination can be either direct on the silicon surface or it may be a contamination of a masking surface, changing the circuit design which is printed. Point-of-use filters must, therefore, remove microparticulates that would cause defects.

In addition, a point-of-use filter should not add contaminants, such as low levels of ionic and total organic carbon (TOC) extractables. Extractables are substances which may be potentially released from a filter element and contaminate its effluent. If such contaminants are deposited on silicon wafers, they may cause defects, resulting in a yield loss during the fabrication of integrated circuits. As a result, industry practice is to test the resistivity of the effluent at the point-of-use filters. Only after the effluent has reached the level of purity of the influent can the effluent be used for fabricating integrated circuits.

Embodiments of the disclosure are directed to a device for applying a magnetic field around a filter for filtering solvents used in photolithography, wet etching, wet cleaning or similar operations performed on a semiconductor wafer. Some embodiments are directed to reducing metal defects in a photoresist development process by applying a magnetic field around a filter (e.g., a point-of-use (POU) filter) used to filter a solvent used in the photoresist development process. In some embodiments, the solvent is tetramethylammonium hydroxide (TMAH) used in developing exposed photoresist or etching operations. The filtering minimizes metallic contaminants (ions or charged particles) such as iron (Fe), aluminum (Al), and the like. The metallic contaminants in the solvents may introduce scum defects, which are undesirable presence of the metallic particulate matter around patterns on the wafer. By filtering the metallic contaminants, the scum defects may be reduced. Although embodiments are discussed with reference to reducing metal defects in a positive tone development (PTD) process, the principles disclosed herein are equally applicable to filtering solutions used in other processes such as, but not limited to, negative tone development (NTD) process.

FIG. 1 is a schematic view of an apparatus 100 for depositing a solvent on a semiconductor wafer, according to embodiments of the disclosure. One of ordinary skill in the art would understand that one or more additional features are utilized with the apparatus 100 shown in FIG. 1. Additionally, although the apparatus 100 is discussed as being used to deposit a solvent on a semiconductor wafer, embodiments are not limited thereto. In other embodiments, the apparatus 100 is used to deposit the solvent or a fluid on any desired substrate, without departing from the scope of the disclosure.

The apparatus 100 includes a housing or an enclosure 101 in which a substrate holder 103 is disposed. The substrate holder 103 is configured to hold or secure a semiconductor wafer 110 and to rotate the semiconductor wafer 110 at various speeds. The apparatus 100 includes several fluid nozzles, including a first fluid nozzle 121 configured to dispense the solvent to be deposited on the semiconductor wafer 110, a second fluid nozzle 123 configured to dispense a cleaning solution to clean the semiconductor wafer 110, and a third fluid nozzle 125 configured to dispense de-ionized water onto the semiconductor wafer 110. The nozzles 121, 123, and 125 are movable in transverse directions and in the vertical direction in some embodiments. Although the apparatus 100 is discussed as including three nozzles, the number of nozzles is not limited thereto and can be increased or decreased. Further, a UV light source or a heater 130 is disposed inside or outside the housing 101.

The first fluid nozzle 121 is fluidly connected to a solvent source 115 holding the solvent, and the second fluid nozzle 123 is fluidly connected to a cleaning solution source 150 holding the cleaning solution. In other embodiments, the source 150 stores a photo resist tank or bottle. Further, the third fluid nozzle 125 is fluidly connected to a de-ionized water source, which may be a facility de-ionized water source.

In some embodiments, a filter (e.g., point-of-use filter) 200 is fluidly connected to the solvent source 115 to filter the solvent provided to the first fluid nozzle 121. In other embodiments, a filter 260 is fluidly connected to the cleaning solution source 150 to filter the cleaning solution provided to the second fluid nozzle 123. The filter 260 may be similar to the filter 200 in some respects.

At least some of the operations of the apparatus 100 are controlled by one or more controllers 180 connected to or including one or more memory devices 190. The controller 180 is a computer system including one or more processors and the memory devices 190 store computer readable program code, in some embodiments. The controller 180 can be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or any other suitable entity that can perform calculations or other manipulations of information. The one or more memory devices 190 can be a random access memory (RAM), a flash memory, a read only memory (ROM), a programmable read-only memory (PROM), an erasable PROM (EPROM), registers, a hard disk, a removable disk, a CD-ROM, a DVD, or any other suitable storage device, for storing information and computer readable program code to be executed by controller 180.

When the program code is executed by the controller 180, the controller 180 controls the operations of, for example, the substrate holder 103, the nozzles 121, 123 and 125, fluid flows of the solutions flowing therethrough, and a heater/UV light source 130.

According to embodiments, the magnetic field is applied using a ring-shaped (or annular) magnet arranged in an N-S-N-S sequence about the filters 200 and/or 260. The filters 200 and/or 260 have a cylindrical filter housing in some embodiments and the ring-shape, may thus, increase the contact area of the magnet with the filter. However, the shape and type of the magnets are not limited in this regard. In some embodiments, neodymium magnets are used. In other embodiments, other types of magnets having a desired shape (e.g., bar shape) that provide the desired results (e.g., adequate reduction in contaminants as desired for the fabrication process) may be used.

Figure 2A:
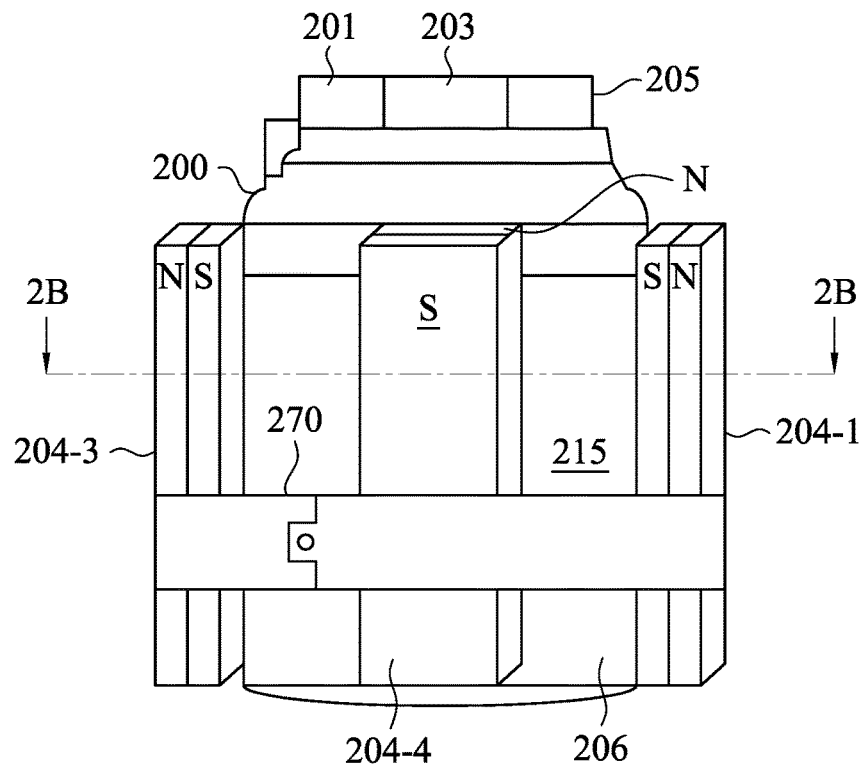
FIG. 2A schematically illustrates an elevation view of a filter having magnets arranged about the filter, according to embodiments of the disclosure.
Figure 2B:
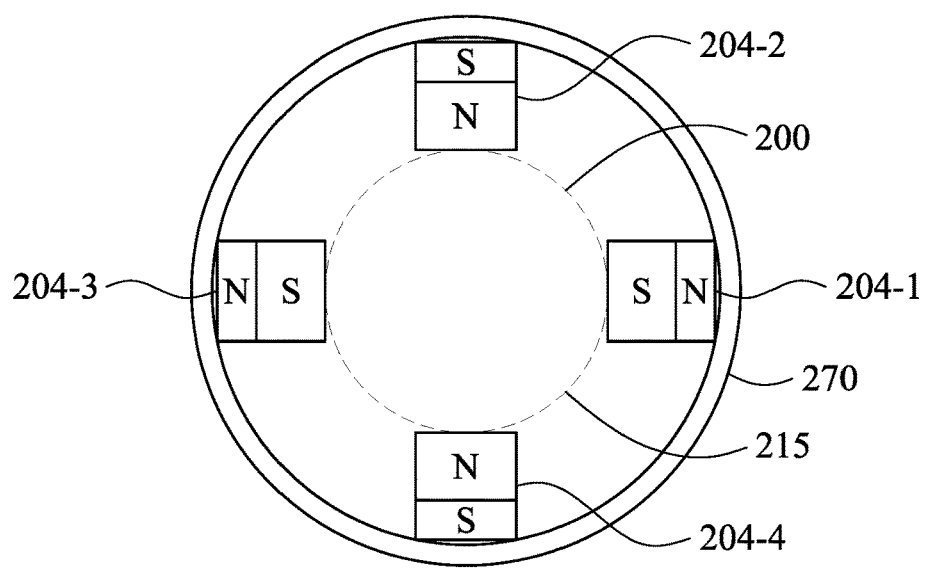
FIG. 2B illustrates a cross-sectional view of the filter in FIG. 2A taken along line 2B-2B in FIG. 2A.

FIG. 2A schematically illustrates an elevation view of the filter 200 (and/or 260) having magnets 204-1, 204-2, 204-3, and 204-4 arranged about the filter 200, according to some embodiments. FIG. 2B illustrates a cross-sectional view of the filter 200 taken along line 2B-2B in FIG. 2A. In some embodiments, the filter 200 is used as a point-of-use filter for filtering metallic contaminants present in solvents (e.g., TMAH) used in the development operation in wafer fabrication. However, embodiments are not limited in this regard.

Embodiments disclosed herein are equally applicable to other wafer fabrication operations that use filtered solvents, without departing from the scope of the disclosure. Further, embodiments discussed herein with reference to filter 200 are equally applicable to filter 260 in FIG. 1, without departing from the scope of the disclosure.

In the arrangement illustrated in FIGS. 2A and 2B, four magnets 204-1, 204-2, 204-3, and 204-4 (collectively, magnets 204) are arranged about the filter 200. The magnets 204 may be neodymium magnets. In other embodiments, the magnets 204 are electromagnets. However, magnets 204 are not limited to neodymium magnets or electromagnets or a particular magnet. Any magnet can be used according to application and user preferences. The magnets 204 are attached to an external surface 215 of a filter housing 206 and are secured using a restraining device. In an embodiment, and as illustrated, the restraining device is a band 270. The ends of the band 270 are coupled to each other using by fasteners (nuts and bolts, screws, pins, rivets, anchors, seams, crimps, snap-fits, shrink-fits, etc.). Further, the band 270 is adjustable such that the band 270 can be used to secure the magnets 204 to filter housings of different sizes (e.g., diameters). Although, only one band 270 is illustrated, it will be understood that more than one band 270 can be used to secure the magnets 204.

Figure 2C:
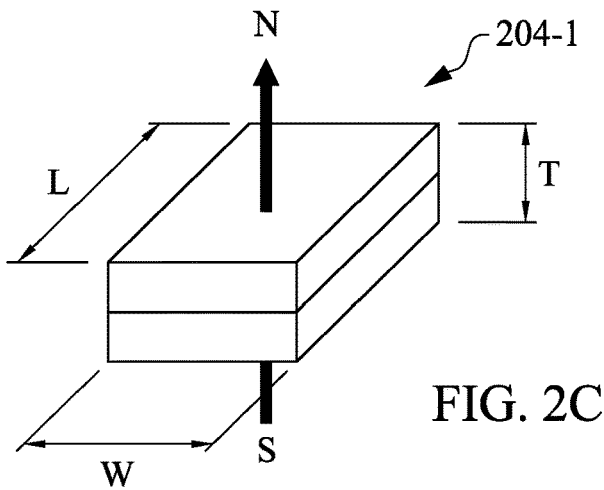
FIG. 2C illustrates a magnet in FIG. 2A, according to embodiments of the disclosure.

FIG. 2C illustrates magnet 204-1, according to embodiments of the disclosure. Magnets 204-2, 204-3, and 204-4 in FIGS. 2A and 2B are similar to magnet 204-1. As illustrated, magnet 204-1 is a bar or block magnet having an axis of magnetization in the thickness (T) dimension and perpendicular to the length (L) and width (W) dimensions of the magnet 204-1. Referring to FIGS. 2A and 2B, the magnets 204 are attached to the external surface 215 of the filter housing 206 in the lengthwise direction.

Figure 2D:
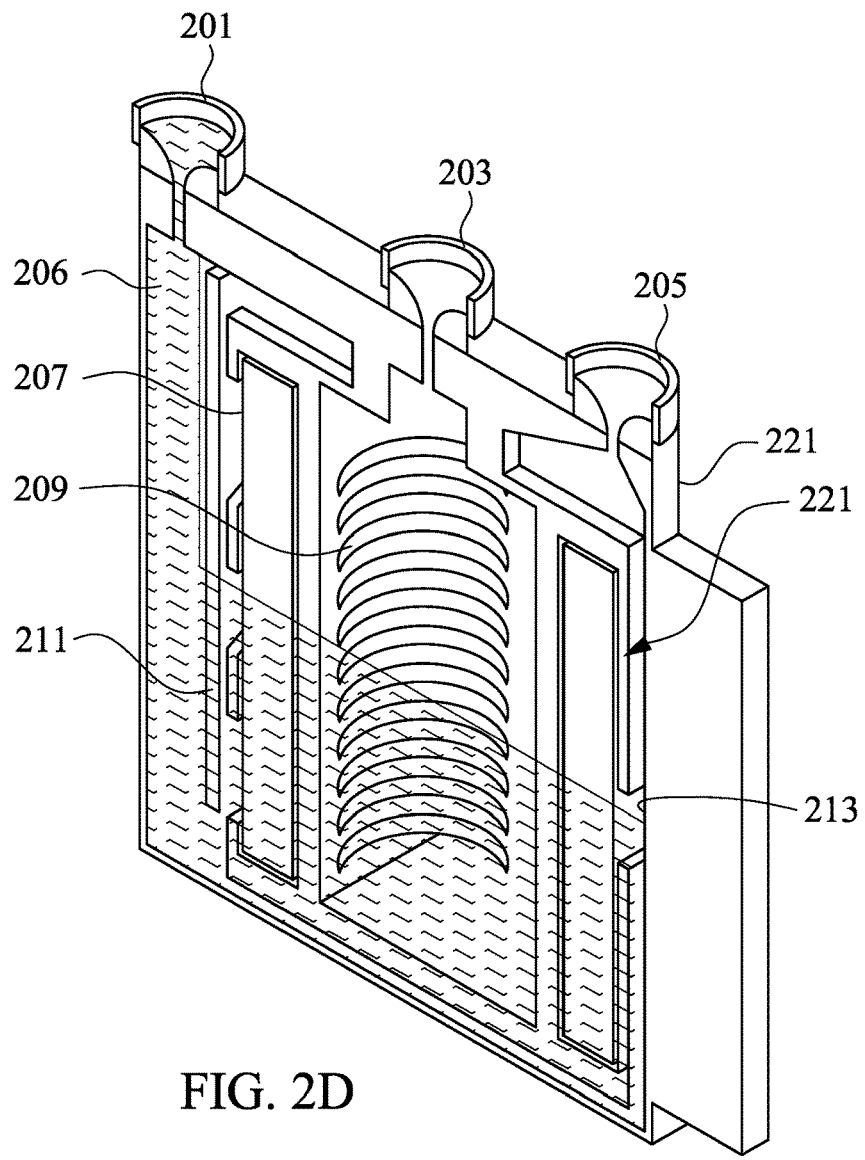
FIG. 2D illustrates a partial cross-sectional view of the filter in FIG. 2A, according to embodiments of the disclosure.

FIG. 2D illustrates a partial cross-sectional view of the filter 200, according to embodiments of the disclosure. It should be noted that the filter 200, as discussed herein, is merely an example of a variety of different filters that can used to filter the solvent (or other fluids) to minimize the content of the metallic contaminants therein. It will be understood that the structure of the filter 200 is not limiting in any regard and the magnets 204 can used with other types of filters for filtering metallic contaminants, such as ions, according to embodiments discussed herein and without departing from the scope of the disclosure. For the sake of clarity of illustration, the magnets 204 and the band 270 are omitted in FIG. 2D.

As illustrated, the filter housing 206 includes, or otherwise defines, an inlet 201 and an outlet 203 of the filter 200.

The inlet 201 and the outlet 203 are located on an upper surface of the filter housing 206 in some embodiments. However, the inlet 201 and the outlet 203 can be located at other locations on the filter housing 206 in other embodiments. The filter housing 206 is a generally cylindrical structure made of high-density polyethylene (HDPE), or similar material. The filter housing 206 defines, or otherwise includes, an inner volume 221 into which the solvent to be filtered is introduced using the inlet 201 and from which filtered solvent is removed using the outlet 203. The filter housing 206 also encloses in the inner volume 221 a filter cage 207 including a filter membrane 209. The filter membrane 209 is a hollow cylindrical structure that is installed within the filter cage 207. The filter cage 207 provides support to the filter membrane 209 and maintains the shape and form of the filter membrane 209. In some embodiments, and as illustrated, the filter cage 207 is centrally located in the filter housing 206. However, in other embodiments, the filter cage 207 is radially offset from the center of the filter housing 206.

As illustrated, the inlet 201 is located along a periphery or an outer edge of the upper surface of the filter housing 206. The outlet 203 is in fluid communication with the filter cage 207 such that the solvent (or other fluids) after filtering by the filter membrane 209 exits the filter 200 via the outlet 203. Solvent (or other fluid) to be filtered is introduced into the filter 200 via the inlet 201 and passes through a passageway 211 that is fluidly connected to the inlet 201. The passageway 211 isolates upper portions of the filter cage 207 and the filter membrane 209 from the solvent introduced in the filter housing 206 and directs the solvent to bottom portions of the filter housing 206. The passageway 211 isolates the solvent from the filter cage 207 and the filter membrane 209 part way through the filter housing 206, and thereby prevents the solvent from contacting the filter cage 207 and the filter membrane 209 directly upon being introduced into the filter housing 206. The filter housing 206 also includes (or otherwise defines) a vent 205 that is located on the upper surface of the filter housing 206. The vent 205 functions to purge contaminated solvent prior to the solvent passing through the filter membrane 209.

Referring to FIGS. 2A, 2B, 2C, and 2D, the magnets 204 are attached lengthwise to the external surface 215 of the filter housing 206. In an embodiment, and as illustrated, circumferentially adjacent magnets 204 have opposite polarity poles contacting the filter housing 206. Additionally, diametrically opposite magnets 204 have the same polarity poles contacting the filter housing 206.

Such an arrangement of magnets 204 results in a reduced net magnetic field in the central region of the filter housing 206 including the filter membrane 209 and the metallic contaminants are attracted to the periphery of the filter housing 206, as discussed below. Stated otherwise, the magnetic field is greater in the peripheral portion of the filter housing 206 compared to the magnetic field in the central portion of the filter housing 206.

The number of magnets 204 is not limited in any regard and the number of magnets 204 can be increased or decreased as needed by the application and design and without departing from the scope of the disclosure. In some embodiments, the number of magnets is six or eight. The shape of the filter housing 206 is also not limited in any regard. The housing can have any desired shape and any number of magnets 204 can be arranged on the filter housing 206 in a desired arrangement provided the magnetic field in the peripheral portion of the filter housing 206 is greater than the magnetic field in the central portion of the filter housing 206.

Figure 2E:
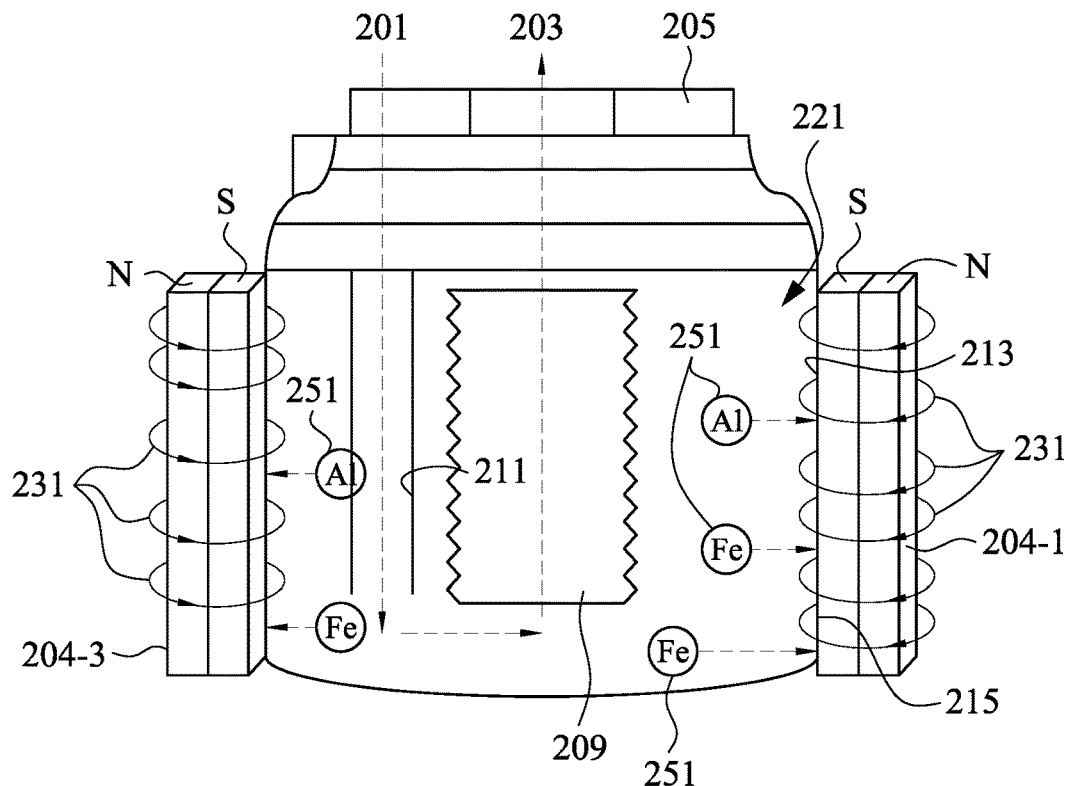
FIG. 2E schematically illustrates a fluid flow inside the filter housing of the filter in FIGS. 2A and 2B having magnets attached thereto, according to embodiments of the disclosure.

FIG. 2E schematically illustrates a fluid flow inside the filter housing 206 of the filter 200 having magnets 204 attached thereto, according to embodiments of the disclosure. For the sake of clarity of illustration, the band 270 is omitted in FIG. 2E. As illustrated, solvent (or any fluid) from which metallic contaminants are to be filtered is introduced into the filter housing 206 via the inlet 201. The solvent flows through the passageway 211 into portions of the filter housing 206 outside the filter membrane 209. Specifically, the solvent occupies the portions of the filter housing 206 outside the filter membrane 209 prior to flowing through the filter membrane 209. The arrangement of the magnets 204-1 and 204-3 (with the S poles facing each other) causes magnetic fields 231 of the magnets 204-1 and 204-3 to repel each other. Likewise, the arrangement of the magnets 204-2 and 204-4 (with the N poles facing each other) causes magnetic fields of the magnets 204-2 and 204-4 to repel each other. As a result, the magnetic field 231 due to the magnets 204 is reduced (e.g., negligible) in the central portion of the filter housing 206 and the metallic contaminants 251 (iron (Fe) particles or aluminum (Al) particles as illustrated) are attracted to the inner surface 213 of the filter housing 206 due to the magnetic field from the magnets 204 and are thus trapped. The metallic contaminants are trapped before the entering the filter membrane 209. As a result, the life of the filter membrane 209 is increased and the filter membrane 209 can be replaced at less frequently. Because of a pressure differential between the inlet 201 and the outlet 203, the solvent passes through the filter membrane 209 where other contaminants (e.g., non-metallic contaminants) not removed due to the magnets 204 are filtered. The solvent then exits the filter 200 via the outlet 203. In some embodiments, the exiting solvent is recirculated through the filter 200. Recirculating the solvent increases the number of metallic contaminants that are filtered from the solvent. In some embodiments, the pressure differential is adjusted to reduce the flow of the solvent through the filter 200. By reducing the flow, the solvent is exposed to the magnetic field for a relatively longer time period and an increased number of metallic contaminants are filtered from the solvent. By controlling the flow of the solvent through the filter 200 and/or by recirculating the solvent through the filter 200, the amount of metallic contaminants filtered from the solvent can be increased.

Figure 3:
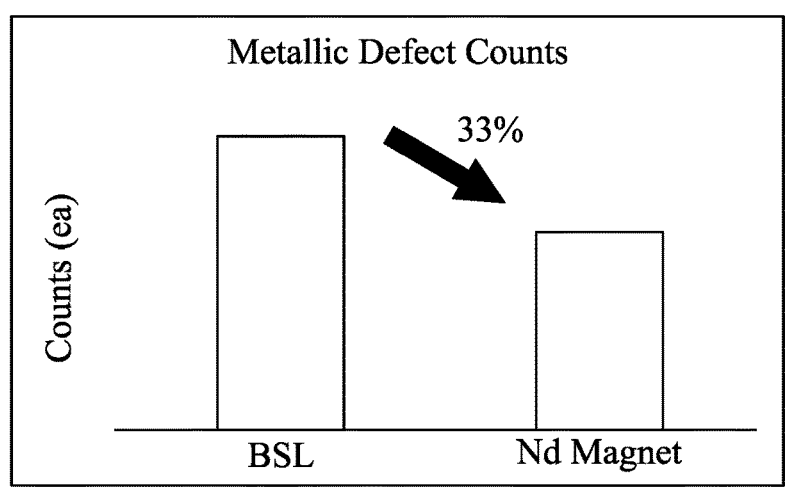
FIG. 3 is a graph illustrating reduction in metallic impurities using the arrangement in FIGS. 2A and 2B.

FIG. 3 is a graph 300 illustrating the reduction in metallic impurities using the magnet arrangement in FIGS. 2A-2E. As illustrated, when using the magnetic arrangement of the magnets 204, a reduction of about 33% in the number of metallic contaminants is observed from a baseline (BSL) measurement performed in the absence of the magnets 204.

Figure 4A:
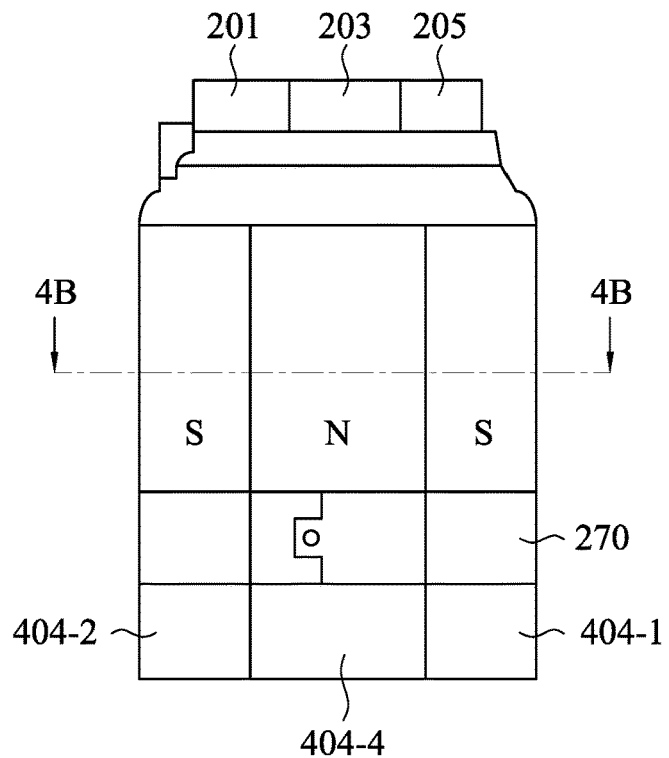
FIG. 4A schematically illustrates an elevation view of the filter in FIG. 2A including a plurality of magnetic arc segments, according to embodiments of the disclosure.
Figure 4B:
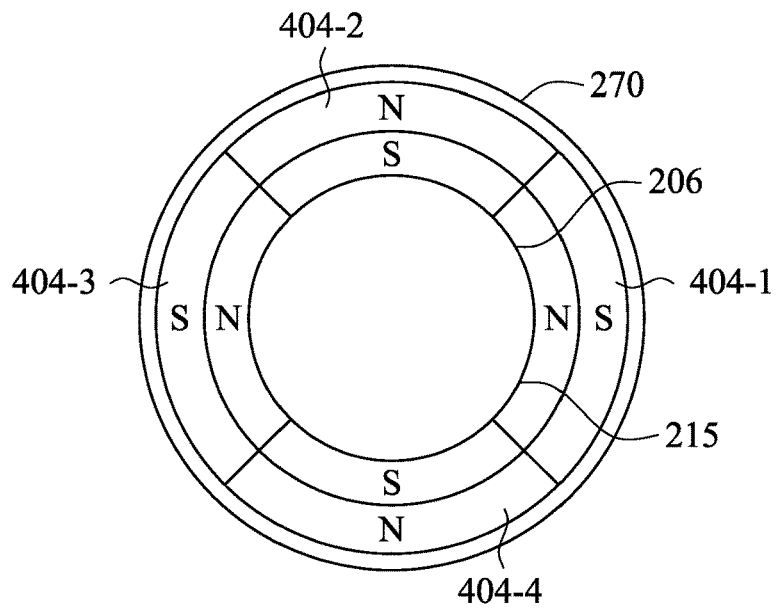
FIG. 4B is a cross-sectional view of the filter in FIG. 4A taken along the line 4B-4B in FIG. 4A, according to embodiments of the disclosure.

FIG. 4A schematically illustrates an elevation view of the filter 200 having magnets 404-1, 404-2, 404-3, and 404-4 arranged about the filter 200, according to embodiments of the disclosure. FIG. 4B is a cross-sectional view of the filter 200 taken along the line 4B-4B in FIG. 4A. For the sake of explanation, embodiments are discussed with reference to the filter 200 of FIGS. 2A and 2B. However, it will be understood that embodiments are not limited in this regard. Other types of filters can also be used with the magnets 404-1, 404-2, 404-3, and 404-4, without departing from the scope of the disclosure.

Referring to FIGS. 4A and 4B, the magnets 404-1, 404-2, 404-3, and 404-4 (collectively, magnets 404) are each shaped as arc segments that are attached to the external surface 215 of the filter housing 206. The magnets 404 are arranged such that adjacent magnets have opposite polarity poles contacting the filter housing 206, and diametrically opposite magnets have same polarity poles contacting the filter housing 206. Each magnet 404-1, 404-2, 404-3, and 404-4 is sized and shaped (or otherwise configured) such that an entire inner radial surface 415 or 417 (FIGS. 4C and 4D) of a magnet contacts the external surface 215. As illustrated, the magnets 404-1, 404-2, 404-3, and 404-4 are arranged end-to-end (e.g., each magnet 404 contacts a circumferentially adjacent magnet) to form a ring type magnet and thereby overlap the entire internal volume 221 of the filter housing 206. In some embodiments, and as illustrated, a restraining device 270, e.g., a band, is used to secure the magnets 404 on the external surface 215. As mentioned above, the band 270 is adjustable such that the band 270 can be used to secure the magnets 404 of different sizes (e.g., arc lengths) for filter housings of different sizes (e.g., diameters). Although, only one band 270 is illustrated, it will be understood that more than one band 270 can be used to secure the magnets 404. As illustrated, diametrically opposite magnets have poles of the same polarity facing each other. Thus, the magnetic fields 231 (FIG. 4E) of the magnets repel each other. As a result, a reduced magnetic field is produced in the central portion of the filter housing 206 including the filter membrane 209 and the metallic contaminants are attracted to the inner surface 213 of the filter housing 206. Stated otherwise, the magnetic field due to the magnets 404 is greater in the peripheral portion of the filter housing 206 compared to the magnetic field in the central portion of the filter housing 206.

The magnets 404 may be a neodymium magnet. In other embodiments, the magnets 404 are electromagnets. However, the magnets 404 are not limited to a neodymium magnet, electromagnet, or any particular magnet, and any magnet can be used according to application and user preferences.

Figure 4C:
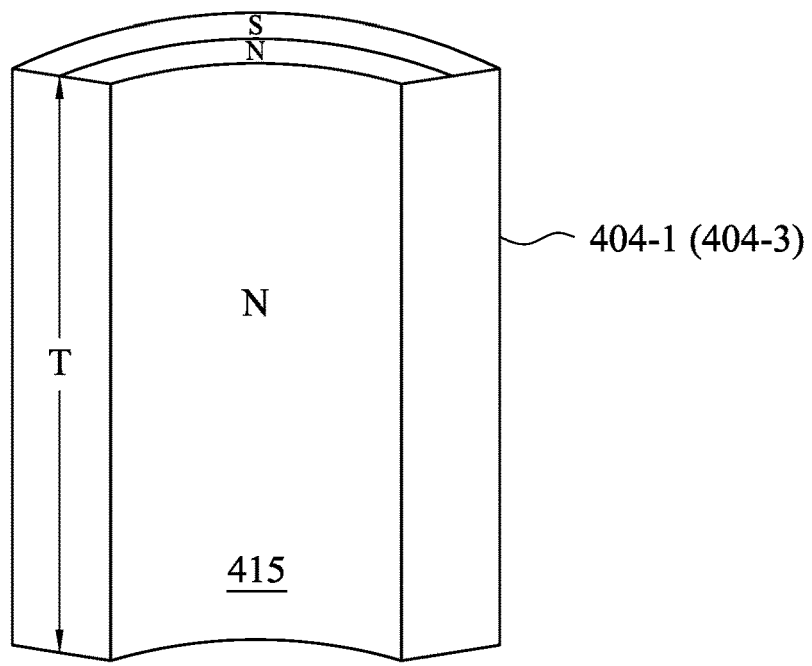
FIG. 4C illustrates a magnetic arc segment in FIG. 4A, according to embodiments of the disclosure.
Figure 4D:
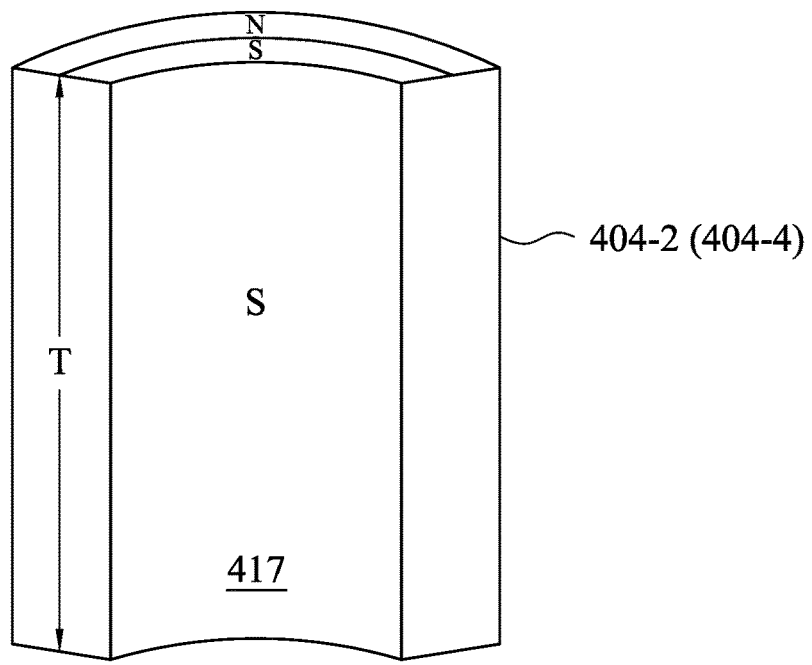
FIG. 4D illustrates another magnetic arc segment in FIG. 4A, according to embodiments of the disclosure.

FIG. 4C illustrates the magnet 404-1 (or 404-3), according to embodiments of the disclosure. FIG. 4D illustrates the magnet 404-2 (or 404-4), according to embodiments of the disclosure. As illustrated in FIG. 4C, a radially inner portion of each magnet 404-1 and 404-3 includes the north (N) pole and a radially outer portion of each magnet 404-1 and 404-3 includes the south (S) pole. The arrangement of the poles is opposite in magnets 404-2 and 404-4. As illustrated in FIG. 4D, a radially inner portion of each magnet 404-2 and 404-4 includes the south (S) pole and a radially outer portion of each magnet 404-2 and 404-4 includes the north (N) pole. A thickness (T) of each magnet 404-1, 404-2, 404-3, and 404-4 is such that the magnets cover the entire external surface 215 of the filter housing 206 when attached thereto.

Although filter 200 is illustrated as including four magnets 404-1, 404-2, 404-3, and 404-4, embodiments are not limited thereto. In some other embodiments, the filter 200 includes more than four magnets. In still other embodiments, a magnet formed by a single unitary ring-shaped piece of material that is magnetized such that circumferentially adjacent arc portions have opposite polarity poles contacting the filter housing 206 can be used. In such an embodiment, the magnet has an opening that is shaped and sized (or otherwise configured) to receive the filter housing 206.

In some embodiments, the magnets 404-1, 404-2, 404-3, and 404-4 have a thickness (T) smaller than the height of the filter housing 206 such that the magnets 404-1, 404-2, 404-3, and 404-4 do not cover the entire external surface 215 of the filter housing 206. In such embodiments, the uncovered portion of the filter housing 206 is covered by other magnets similar to magnets 404-1, 404-2, 404-3, and 404-4.

The magnets 404-1, 404-2, 404-3, and 404-4 increase the contact area with the filter housing 206 and metallic contaminants in the solvent are attracted over the increased surface area of the inner surface 213.

Figure 4E:
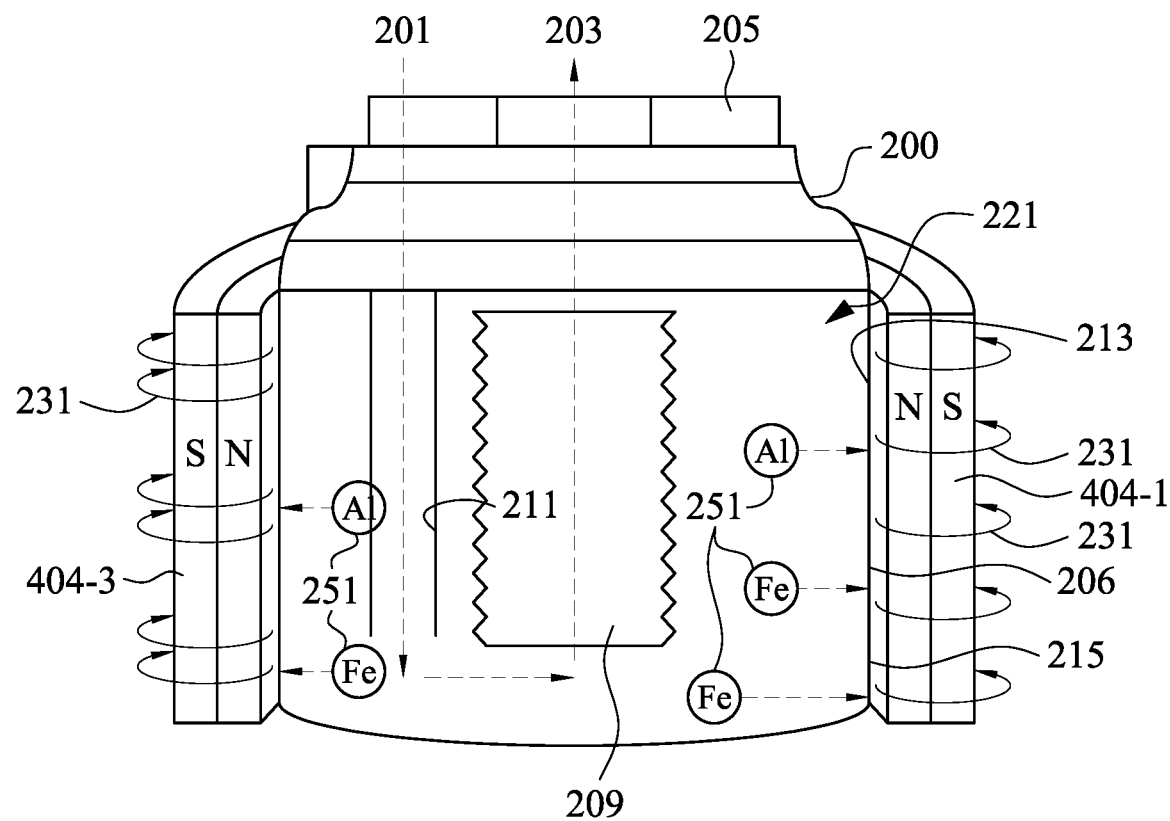
FIG. 4E schematically illustrates a fluid flow in the filter in FIG. 4A having magnets attached thereto, according to embodiments of the disclosure.

FIG. 4E schematically illustrates a fluid flow in the filter 200 having the magnets 404-1, 404-2, 404-3, and 404-4 attached thereto, according to embodiments of the disclosure. For the sake of clarity of illustration, the band 270 is omitted in FIG. 4E. The fluid flow and the separation of the metallic contaminants when using the magnets 404 is similar to the fluid flow and the separation of the metallic contaminants when using the magnets 204 in FIG. 2E. Briefly, solvent (or any fluid) from which metallic contaminants are to be filtered is introduced into the filter housing 206 via the inlet 201. The solvent flows through the passageway 211 into portions of the filter housing 206 outside the filter membrane 209. As illustrated, metallic contaminants 251, such as iron (Fe) or aluminum (Al) particles, are attracted to the inner surface 213 of the filter housing 206 due to the magnetic field from the magnets 404 and are trapped. The metallic contaminants are trapped before the entering the filter membrane 209. As a result, in some embodiments, the life of the filter membrane 209 is increased and the filter membrane 209 is replaced less frequently. The solvent passes through the filter membrane 209 and exits the filter 200 via the outlet 203. In some embodiments, the exiting solvent is recirculated through the filter 200. Recirculating the solvent increases the number of metallic contaminants that are filtered from the solvent. In some embodiments, the pressure differential between the inlet 201 and the outlet 203 is adjusted to reduce the flow of the solvent through the filter 200. By reducing the flow, the solvent is exposed to the magnetic field of the magnets 404 for a relatively longer time period and an increased number of metallic contaminants are filtered from the solvent. By controlling the flow of the solvent through the filter 200 and/or by recirculating the solvent through the filter 200, the amount of metallic contaminants filtered from the solvent can be increased.

Figure 5A:
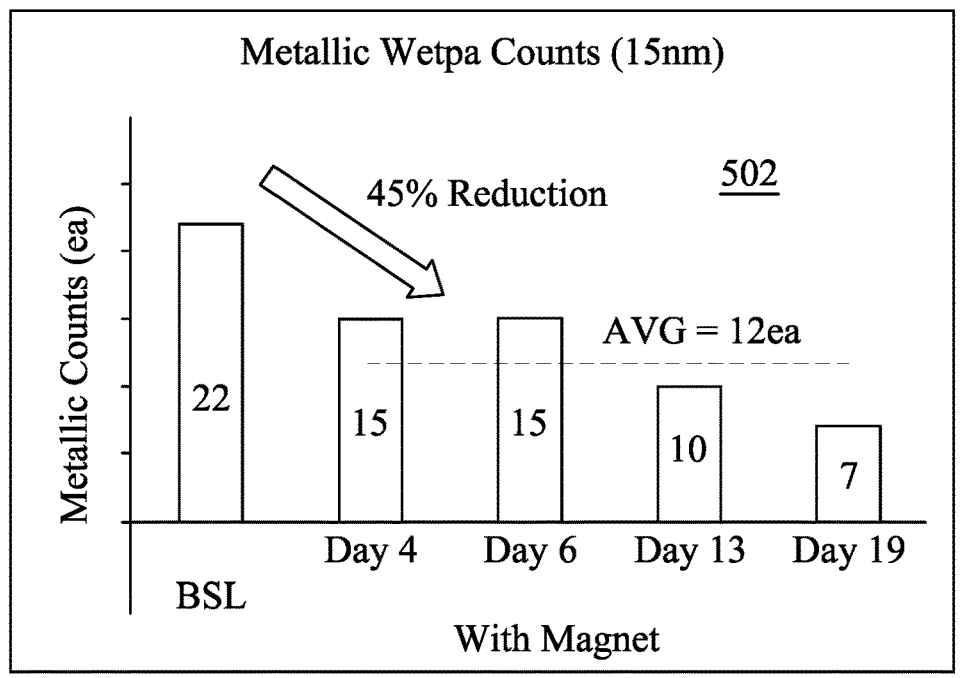
FIG. 5A is a graph illustrating sample results of an experiment to study the reduction in metallic impurities using the magnetic arrangement in FIG. 4A, according to embodiments of the disclosure.

FIG. 5A is a graph 502 illustrating results of an experiment to study the reduction in metallic contaminants using the magnetic arrangement in FIGS. 4A and 4B, according to embodiments of the disclosure. In conducting the experiment, the pixel size of the recipe in the particle measurement tool was set to 15 nm. A solution (e.g., a resist developing solution) that was filtered for multiple continuous days using the filter 200 including the magnets 404 is dispensed on an uncoated (bare) wafer. The wafer was then scanned using the particle measurement tool to obtain particle count. As indicated in the graph 502, the metallic contaminant count decreased as the number of days the solution was filtered increased. For instance, as indicated, the metallic contaminant count was 15 in day 4 and day 6, on day 13 the metallic contaminant count was 10, and the metallic contaminant count was 7 on day 19. The average daily metallic contaminant count was determined to be 12. A reduction of about 45% was observed on average in the metallic contaminant count from a baseline (BSL) measurement performed after filtering in the absence of the magnet 404.

Figure 5B:
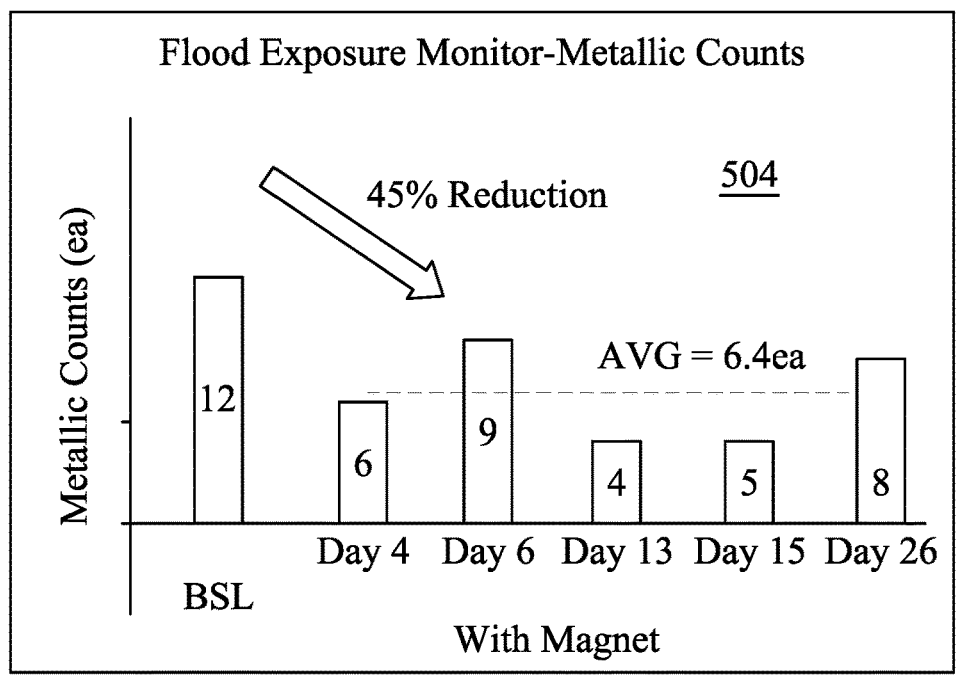
FIG. 5B is a graph illustrating sample results of another experiment to study the reduction in metallic impurities using the magnetic arrangement in FIG. 4A, according to embodiments of the disclosure.

FIG. 5B is a graph 504 illustrating results of another experiment to study the reduction in metallic impurities using the magnetic arrangement in FIGS. 4A and 4B, according to embodiments of the disclosure. In conducting the experiment, a test wafer was coated with middle layer (ML) and photoresist (PR) and was exposed by the scanner. Then, a solution (e.g., a resist developer) that was filtered for multiple continuous days using the filter 200 including magnets 404 is dispensed on the exposed wafer to remove the photoresist. An etch back process was performed to etch the middle layer. The wafer was then scanned using the particle measurement tool to obtain particle count. As indicated in the graph 504, the metallic contaminant count generally decreases as the number of days the solution was filtered increased. For instance, the metallic contaminant count was 6 on day 4 and was 9 on day 6. On day 13, the metallic contaminant count was 4, the metallic contaminant count was 5 on day 15, and was 8 on day 26. An overall reduction of about 45% was observed on average in the number of metallic contaminant count from a baseline (BSL) measurement performed in the absence of the magnet 404.

According to embodiments, the filter 200 in FIGS. 2A-2E and FIGS. 4A and 4B is used to filter a developer solution used in photolithographic operations for semiconductor fabrication. Typically, in semiconductor fabrication, a photoresist layer is applied to a surface of a semiconductor substrate. The photoresist layer is then exposed to a pattern of radiation. Typically, the chemical properties of the photoresist regions struck by incident radiation change in a manner that depends on the type of photoresist used. A positive photoresist become soluble when exposed to the radiation, while the portion of the photoresist that is non-exposed (or exposed less) is insoluble. A negative photoresist becomes insoluble when exposed to the radiation, while the portion of the photoresist that is non-exposed is soluble. A developer solution is then used to remove soluble portions of the photoresist layer. Prior to application, the developer solution is filtered using the filter 200 (FIGS. 2A and 2B, and FIGS. 4A and 4B) to remove (or otherwise minimize) metallic contaminants contained therein.

Figure 6:
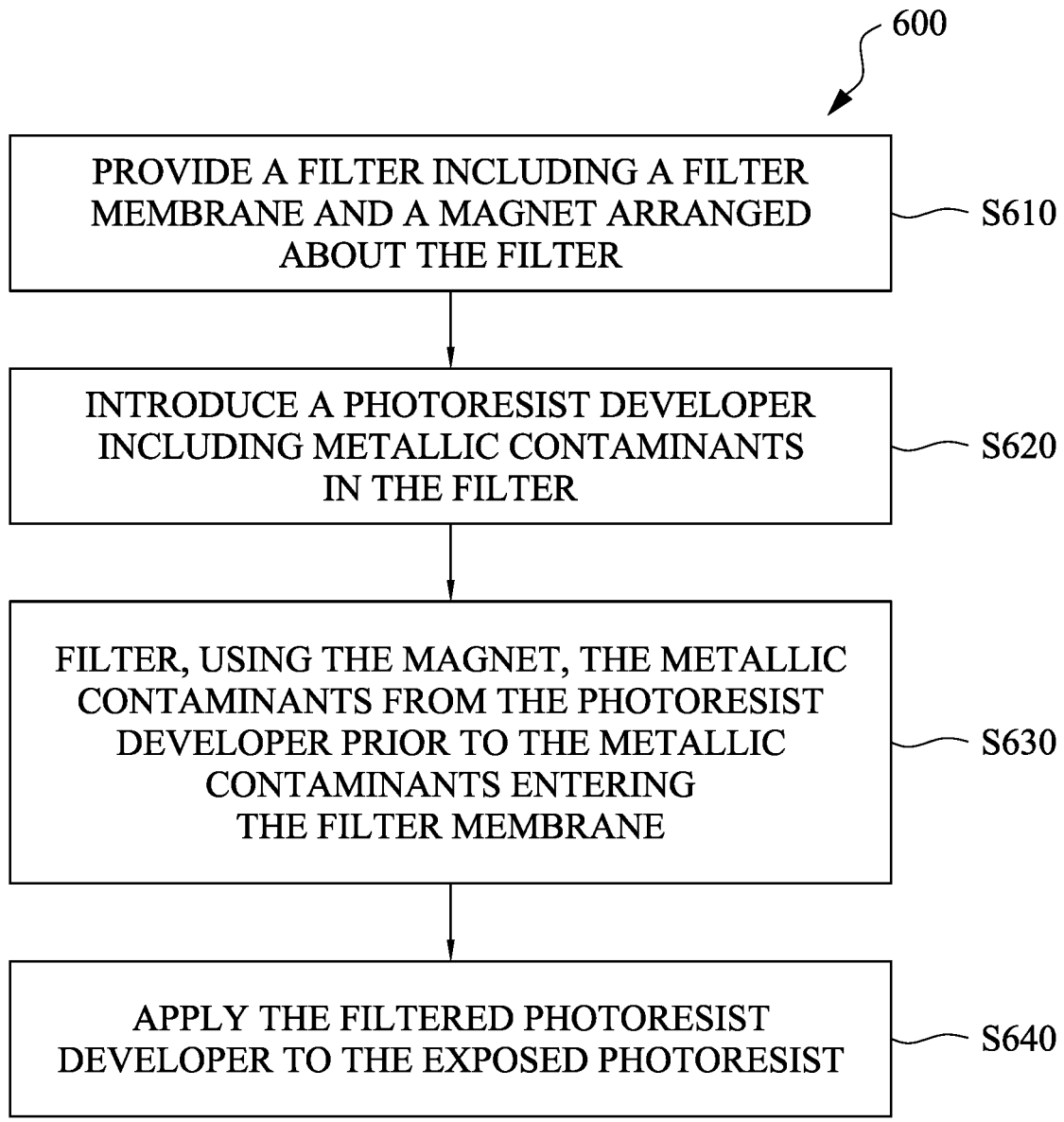
FIG. 6 is a flow chart illustrating a method of developing an exposed photoresist according to an embodiment of the present disclosure.

An embodiment of the present disclosure is a method 600 of developing an exposed photoresist according to the flowchart illustrated in FIG. 6. It is understood that additional operations can be provided before, during, and after processes discussed in FIG. 6, and some of the operations described below can be replaced or eliminated, for additional embodiments of the method. The order of the operations/processes may be interchangeable and at least some of the operations/processes may be performed in a different sequence. In some embodiments, at least two or more operations/processes are performed overlapping in time, or almost simultaneously.

The method 600 includes an operation S610 of providing a filter including a filter membrane and a magnet arranged about the filter. In operation S620, a photoresist developer including metallic contaminants is introduced in the filter. In operation S630, metallic contaminants are filtered from the photoresist developer using the magnet prior to the metallic contaminants entering the filter membrane. In some embodiments, the magnet is arranged such that the magnetic field of the magnet is greater in a periphery of the filter housing compared to a central portion of the filter housing. In some other embodiments, the magnet includes neodymium. In other embodiments, the filter includes a cylindrical filter housing that encloses the filter membrane, and the magnet is a bar magnet. A plurality of the bar magnets are contacted with the filter housing such that circumferentially adjacent bar magnets have opposite polarity poles in contact with the filter and diametrically opposite bar magnets have poles of a same polarity in contact with the filter housing. In still other embodiments, the magnet has an annular shape and includes poles having polarities that alternate along a circumference of the magnet, wherein diametrically opposite polarities of the magnet are same. In yet other embodiments, the filter includes a cylindrical filter housing enclosing the filter membrane and the annular shaped magnet is contacted with an outer surface of the filter housing. In operation S640, the filtered photoresist developer is applied to an exposed photoresist.

As discussed above, the filter 200 of FIGS. 2A-2E and FIGS. 4A-4D filters the metallic contaminants 251 from the solvent using magnets 204 and 404, and other contaminants from the solvent using the filter membrane 209. In some embodiments, filtering the metallic contaminants and other contaminants is performed using separate filters. In this case, a second filter (e.g., a point-of use filter) is used to filter contaminants other than metallic contaminants using the filter membrane 209, for example, and a first separate filter is used to filter metallic contaminants using magnets, as discussed above. The filters are arranged in series such that solvent exiting one filter is provided to the other filter. Thus, in an embodiment, the first filter is arranged before the second filter and thus solvent having metallic contaminants filtered therefrom is provided to the second filter for removing the non-metallic or other contaminants. Alternatively, the first filter is arranged after the second filter and thus solvent having non-metallic or other contaminants filtered therefrom is provided to the first filter for removing the metallic contaminants. By providing separate filters, the filters can be individually serviced, making the system more efficient and economical to operate.

Referring to FIGS. 3, 5A, and 5B, it is observed that both ring-shaped magnets and bar magnets provide improved filtering of metallic contaminants compared to filtering in the absence of magnets. The ring-shaped magnets provide a larger contact area with the surface of the filter housing and increased magnetic field. Further, by incorporating the magnets (ring or bar shaped) around the filter to generate the magnetic field according to some embodiments, changes to be made to the filter are minimal, if needed. Thus, any structural or design changes made to the filter to accommodate the magnets can be quickly and economically implemented. Embodiments of the disclosure further improve the filtration efficiency and wafer quality, and, as such, the wafer yield is increased. The magnetic arrangement, according to embodiments of the disclosure, is not limited to any particular process and may be used in processes using extreme ultraviolet (EUV) radiation, immersion lithography, etc.

An embodiment of the disclosure is a filter including a filter housing having a filter membrane for filtering solvent including metallic contaminants, and a magnet arranged about the filter housing and configured to generate a magnetic field to attract the metallic contaminants prior to the metallic contaminants entering the filter membrane. In an embodiment, the magnet is arranged such that the magnetic field of the magnet is greater in a periphery of the filter housing compared to a central portion of the filter housing. In an embodiment, the magnet includes neodymium. In some embodiments, the magnet is a bar magnet and the filter housing is cylindrical, a plurality of bar magnets are attached to the filter housing, and circumferentially adjacent bar magnets have opposite polarity poles in contact with the filter housing and diametrically opposite bar magnets have poles of a same polarity in contact with the filter housing. In other embodiments, the magnet includes a plurality of arc segments arranged about the filter housing, radially inner surfaces of adjacent arc segments include opposite polarity poles, and radially inner surfaces of diametrically opposite arc segments have same polarity poles. In some embodiments, wherein the filter housing is cylindrical and the plurality of arc segments contact an outer surface of the filter housing. In other embodiments, wherein a plurality of magnets are disposed about the filter. In an embodiment, the plurality of annular shaped magnets contact an outer surface of the filter housing.

Another embodiment of the disclosure is a method of developing an exposed photoresist, including providing a filter including a filter membrane and a magnet arranged about the filter, introducing a photoresist developer including metallic contaminants in the filter, filtering, using the magnet, metallic contaminants from the photoresist developer prior to the metallic contaminants entering the filter membrane, and applying the filtered photoresist developer to the exposed photoresist. In an embodiment, the method further includes arranging the magnet such that a magnetic field generated by the magnet is greater in a periphery of the filter housing compared to a central portion of the filter housing. In an embodiment, the magnet includes neodymium. In an embodiment, the filter includes a cylindrical filter housing that encloses the filter membrane, and the magnet is a bar magnet, and the method further includes contacting a plurality of bar magnets to the filter housing such that circumferentially adjacent bar magnets have opposite polarity poles in contact with the filter and diametrically opposite bar magnets have poles of a same polarity in contact with the filter housing. In an embodiment, the magnet includes a plurality of arc segments arranged about the filter, adjacent arc segments have opposite polarity poles, and diametrically opposite arc segments have same polarity poles. In an embodiment, the filter includes a cylindrical filter housing enclosing the filter membrane and the method further includes contacting the magnet to an outer surface of the filter housing. In an embodiment, the method further includes contacting a plurality of magnets to the outer surface of the filter housing.

Still another embodiment of the disclosure is a filter including a filter membrane for filtering solvent including metallic contaminants, and an annular magnet arranged about the filter to attract the metallic contaminants prior to the metallic contaminants entering the filter membrane. In an embodiment, the magnet is arranged such that a magnetic field generated by the magnet is greater in a periphery of the filter compared to a central portion of the filter. In an embodiment, the annular magnet includes neodymium. In an embodiment, wherein the annular magnet includes a plurality of magnetic arc segments arranged about the filter, adjacent arc segments have opposite polarity poles, and diametrically opposite arc segments have same polarity poles. In an embodiment, the filter includes a filter housing that encloses the filter membrane and the annular magnet contacts an outer surface of the filter housing. In an embodiment, a plurality of annular magnets contact an outer surface of the filter housing.

The foregoing outlines features of several embodiments or examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments or examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for filtering a fluid, comprising:
  introducing the fluid including metallic contaminants in a cylindrical filter housing including a filter membrane;
  exposing the fluid along a peripheral region of the cylindrical filter housing to a magnetic field generated by a plurality of electromagnets attached directly to an outer surface of the cylindrical filter housing and circumferentially separated from each other,
    wherein the plurality of electromagnets are a plurality of arc segments, circumferentially adjacent arc segments of the plurality of arc segments have opposite polarity poles in contact with the filter housing, diametrically opposite arc segments of the plurality of arc segments have same polarity poles,
    wherein a magnetic field strength of a magnetic field generated by the plurality of arc segments at a location of the filter membrane is different than a magnetic field strength of the magnetic field generated by the plurality of arc segments along the peripheral region of the cylindrical filter housing, and wherein a first pole of each arc segment of the plurality of arc segments is disposed between the cylindrical filter housing and a second pole of each arc segment, the first pole separates the second pole from the filter housing, and the first pole and second pole have opposite polarities;

passing the fluid through the filter membrane; and
removing the filtered fluid from the cylindrical filter housing.

2. The method of claim 1, wherein the filter membrane is located centrally within the cylindrical filter housing and the magnetic field strength at the location of the filter membrane is lower than the magnetic field strength along the peripheral region of the cylindrical filter housing.

3. The method of claim 1, further comprising filtering the metallic contaminants from the fluid, using the plurality of arc segments, prior to the metallic contaminants entering the filter membrane.

4. The method of claim 1, further comprising reintroducing the filtered fluid into the cylindrical filter housing.

5. The method of claim 1, wherein the magnetic field strength of the magnetic field at the location of the filter membrane is lower than the magnetic field strength of the magnetic field along the peripheral region of the cylindrical filter housing.

6. The method of claim 1, wherein the plurality of arc segments have a same curvature as the cylindrical filter housing.

7. The method of claim 1, wherein the plurality of arc segments are secured to the cylindrical filter housing using an adjustable band.

8. A method, comprising:
providing a filter including a filter membrane and a plurality of electromagnets including a plurality of arc segments arranged about the filter, wherein circumferentially adjacent arc segments of the plurality of arc segments have opposite polarity poles in contact with the filter, and diametrically opposite arc segments of the plurality of arc segments have same polarity poles;
introducing a fluid including metallic contaminants in the filter;
filtering, using the plurality of arc segments, the metallic contaminants from the fluid prior to the metallic contaminants entering the filter membrane; and
removing filtered fluid from the filter.

9. The method of claim 8, further comprising arranging the plurality of arc segments such that a magnetic field generated by the plurality of arc segments is greater in a periphery of the filter compared to a central portion of the filter.

10. The method of claim 8, wherein the filter includes a cylindrical filter housing enclosing the filter membrane and the method further includes contacting the plurality of arc segments to an outer surface of the cylindrical filter housing.

11. A method, comprising:
providing a filter housing including a filter membrane for filtering solvent including metallic contaminants;
attaching a plurality of electromagnets directly to the filter housing and circumferentially separated from each other such that a magnetic field generated by the plurality of electromagnets has a higher magnetic field strength at a periphery of the filter housing than in a central portion of the filter housing, wherein
immediately adjacent electromagnets have different polarity poles in contact with the filter housing,
diametrically opposite electromagnets have a same polarity pole in contact with the filter housing,
a first pole of each electromagnet of the plurality of electromagnets is disposed between the filter housing and a second pole of each electromagnet of the plurality of electromagnets, and
the first pole separates the second pole from the filter housing, wherein the first pole and second pole have opposite polarities;
introducing solvent in the filter housing;
filtering the solvent using the plurality of electromagnets; and
removing the filtered solvent from the filter housing.

12. The method of claim 11, wherein filtering the solvent includes filtering the metallic contaminants from the solvent, using the plurality of electromagnets, prior to the metallic contaminants entering the filter membrane.

13. The method of claim 11, wherein the filter housing includes an inlet for introducing the solvent and an outlet for removing the filtered solvent and the method further comprises generating a pressure differential between the inlet and the outlet to adjust a flow of the solvent through the filter membrane.

14. The method of claim 8, further comprising reintroducing the filtered fluid into the filter.

15. The method of claim 1, wherein the cylindrical filter housing further comprises a passageway extending through the housing at a position outside the filter membrane, and the passageway directs the fluid past the filter membrane, and
the method further comprises passing the fluid through the passageway before passing the fluid through the filter membrane.

16. The method of claim 1, wherein the magnetic field attracts the metallic contaminants to an inner surface of the cylindrical housing.

17. The method of claim 1, wherein the cylindrical filter housing further includes a vent, and
the method further comprises purging the fluid including the metallic contaminants from the cylindrical filter housing through the vent.

18. The method of claim 10, wherein the cylindrical filter housing further comprises a passageway extending through the housing at a position outside the filter membrane, and the passageway directs the fluid past the filter membrane, and
the method further comprises passing the fluid through the passageway before passing the fluid through the filter membrane.

19. The method of claim 10, wherein the cylindrical filter housing includes a vent, and
the method further comprises purging the fluid including the metallic contaminants from the cylindrical filter housing through the vent.

20. The method of claim 11, wherein the filter housing further includes a vent, and
the method further comprises purging the solvent including the metallic contaminants from the filter housing through the vent.

* * * * *